US008086959B2

(12) United States Patent
Rothschiller et al.

(10) Patent No.: US 8,086,959 B2
(45) Date of Patent: Dec. 27, 2011

(54) METHOD AND SYSTEM FOR INFERRING A SCHEMA FROM A HIERARCHICAL DATA STRUCTURE FOR USE IN A SPREADSHEET

(75) Inventors: Chad Rothschiller, Edmonds, WA (US); Michael J. McCormack, Snohomish, WA (US); Eoin Burke, Seattle, WA (US); Kelly J. Lynch, Redmond, WA (US); Roy E. Dumas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1179 days.

(21) Appl. No.: 11/326,853

(22) Filed: Jan. 6, 2006

(65) Prior Publication Data

US 2006/0117250 A1     Jun. 1, 2006

Related U.S. Application Data

(63) Continuation of application No. 10/376,781, filed on Feb. 28, 2003, now Pat. No. 6,990,632.

(51) Int. Cl.
G06F 17/00     (2006.01)
G06F 15/00     (2006.01)

(52) U.S. Cl. .................. 715/255; 715/212; 707/E17.124

(58) Field of Classification Search .................. 715/234, 715/212, 213, 215, 255; 707/E17.124
See application file for complete search history.

(56) References Cited

U.S. PATENT DOCUMENTS 5,909,570 A * 6/1999 Webber ........................... 703/13

6,366,299 B1    4/2002  Lanning et al. ............... 715/738
6,418,446 B1    7/2002  Lection et al. ................ 707/103
6,476,833 B1   11/2002  Moshfeghi .................... 345/854

(Continued)

FOREIGN PATENT DOCUMENTS
WO    WO 0182133    11/2001

OTHER PUBLICATIONS

Modelling and Manipulating Multidimensional Data in Semistructured Databases Raymond E. Wong IEEE 2001.*

(Continued)

*Primary Examiner* — Stephen Hong
*Assistant Examiner* — Ahamed I Nazar
(74) *Attorney, Agent, or Firm* — Merchant & Gould

(57) ABSTRACT

A method and system are provided for inferring a schema from an electronic document containing hierarchical data for use in a spreadsheet application program. The electronic document containing the hierarchical data is received into an application program. The application program may be a spreadsheet application program. The format of the hierarchical data structure may be XML. The hierarchical data includes a set of nodes making up the structure of the hierarchical data. The nodes may be XML elements and attributes. The hierarchical data is then parsed to discover one of the nodes in the hierarchical data. Once the node has been discovered, content associated with the discovered node is saved to a memory location in the computer system. The content may include data associated with the discovered node and the type of data associated with the node. The hierarchical data is then parsed again to discover subsequent nodes until the content for all of the nodes has been saved to the memory location. Then a schema generator generates schema elements using complex rules based on the particular qualities of each discovered node for each discovered node until a schema is generated for the hierarchical data.

19 Claims, 4 Drawing Sheets

U.S. PATENT DOCUMENTS

| | | | |
|---|---|---|---|
| 6,480,860 B1 | 11/2002 | Monday | 707/102 |
| 6,480,865 B1 | 11/2002 | Lee et al. | 707/523 |
| 6,487,566 B1 | 11/2002 | Sundaresan | 707/513 |
| 6,502,101 B1* | 12/2002 | Verprauskus et al. | 707/101 |
| 6,502,112 B1 | 12/2002 | Baisley | 707/513 |
| 6,581,062 B1* | 6/2003 | Draper et al. | 1/1 |
| 6,631,497 B1* | 10/2003 | Jamshidi et al. | 715/205 |
| 6,686,423 B1* | 2/2004 | Desbois et al. | 526/177 |
| 6,868,423 B2 | 3/2005 | Ohta et al. | 707/102 |
| 6,912,538 B2* | 6/2005 | Stapel et al. | 707/101 |
| 6,944,626 B2* | 9/2005 | Cameron et al. | 707/103 R |
| 6,990,632 B2 | 1/2006 | Rothschiller | 715/514 |
| 7,281,205 B2* | 10/2007 | Brook | 715/237 |
| 2002/0099738 A1* | 7/2002 | Grant | 707/513 |
| 2002/0129054 A1 | 9/2002 | Ferguson et al. | 707/503 |
| 2002/0169658 A1* | 11/2002 | Adler | 705/10 |
| 2002/0169788 A1* | 11/2002 | Lee et al. | 707/104.1 |
| 2003/0172196 A1 | 9/2003 | Hejlsberg et al. | 709/328 |
| 2004/0006563 A1* | 1/2004 | Zwiegincew et al. | 707/10 |
| 2004/0025114 A1* | 2/2004 | Hiebert | 715/513 |
| 2004/0054675 A1 | 3/2004 | Li | 707/100 |

OTHER PUBLICATIONS

"Toward a Logical/Physical Theory of Spreadsheet Modeling", Isakowitz et al., New York University, ACM Transactions on Information Systems, vol. 13, No. 1, Jan. 1995, pp. 1-37.*

"Proceedings of the 6th International Workshop on Deductive Databases and Logic Programming DDLP' 98" Jun. 20, 1998, Manchester, United Kingdom, pp. 1-156.*

Spreadsheet Generation from Rule-based Specifications, Boulicaut et al, 1998, University of Helsinki, Department of Computer Science, Helsinki, Finland, pp. 123-134.*

Key et al. (Structural Inference for Semi structured Data, CIKM'01, Nov. 5-10, 2001, Atlanta, Georgia, USA, pp. 159-166).*

Isakowitz et al. "Toward a Logical/Physical Theory of Spreadsheet Modeling", New York University, ACM Transactions on Information Systems, vol. 13, No. 1, Jan. 1995, pp. 1-37.*

Boulicaut, Spreadsheet generation from rule-based specifications, 1998, University of Helsinki, Department of Computer Science, Helsinki, Finland, pp. 123-134.*

Garofalakis et al. (XTRACT: A System for Extracting Document Type Descriptors from XML Documents, MOD 2000, Dallas, TX USA, pp. 165-176).*

Garofalakis et al., XTRACT: A System for Extracting Document Type Descriptors from XML Documents, Bell Laboratories, MOD 2000, Dallas, TX USA, pp. 165-176.*

Jeckle, Practical Usage of W3C's XML—Schema and a Process for Generating Schema Structures from UML Models, DaimlerChrysler Research and Technology, Ulm, Germany, 2001, pp. 1-20.*

Garofalakis et al., XTRACT: A System for Extracting Document Type Descriptors from XML Documents, MOD 2000, Dallas, TX USA, pp. 165-176.*

McKinnon et al., XML in 60 Minutes A Day, pp. 176 and 178.*

"Integrating with External Systems: iPlanet™ Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp..., Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Data", http://msdn.microsoft.com/library/en-us/ibts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids by Using Grid Preview", http://msdn.microsoft.com/library/en-us/bts_2002/htm/lat_xmltools_map_checkfuwn.as..., Microsoft Corporation, 1999-2001, pp. 1.

"The StarOffice™ 6.0 Suite: New Features Guide", Sun Microsystems, V. 1.1, Jul. 2002, pp. 1-31.

"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/press/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

"Integrated Development Environment (IDE)", http://web.archive.org/web/20020602032242/http://altova.com/products_ide.html, Jun. 2002, pp. 1-2.

"Altova markup your mind!", http://web.archive.org/web/20021204211721/http://altova.com/products_ide.html, Dec. 2002, pp. 1-3.

"Arbortext and Accessibility", http://web.archive.org/web/20021219133536/www.arbortext.com/html/accessibility.html, Dec. 2002, pp. 1-5.

"XML Compliance, 100% Pure XML", http:web.archive.org/web/20021209185855/www.arbortext.com/html/xml_compliance, Dec. 2002, pp. 1-3.

"Schemas", http://web.archive.org/web/20021221023148/www.arbortext.com/html/schemas.html, Dec. 2002, pp. 1-3.

"Arbortext's Support for XSL-FO", http://web.archive.org/web/20021221021632/www.arbortext.com/html/xsl-fo.html. Dec. 2002, pp. 1-4.

"Corel XMetal[4], Making XML Content Creation Easy", http://web.archive.org/web/20031118215158/www.corel.com/servlet/Satellite?pagename, Nov. 2003, pp. 1-2.

"Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

"The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

XMLSpy Suite 4.4, XMLSpy User and Reference Manual, May 24, 2002, Altova, pp. 1 and 17-45.

* cited by examiner

US 8,086,959 B2

METHOD AND SYSTEM FOR INFERRING A SCHEMA FROM A HIERARCHICAL DATA STRUCTURE FOR USE IN A SPREADSHEET

CROSS-REFERENCE TO RELATED APPLICATIONS

This patent application is a continuation of U.S. patent application Ser. No. 10/376,781, entitled "METHOD AND SYSTEM FOR INFERRING A SCHEMA FROM A HIERARCHICAL DATA STRUCTURE FOR USE IN A SPREADSHEET," filed Feb. 28, 2003 and assigned to the same assignee as this application. The aforementioned patent application is expressly incorporated herein by reference.

TECHNICAL FIELD

The present invention relates generally to inferring a schema from a hierarchical data structure. More particularly, the present invention relates to receiving an input file in a standard format and generating a schema from data contained in the file for use in a spreadsheet environment.

BACKGROUND OF THE INVENTION

Historically, computer systems and databases have contained data in incompatible formats. As the organizations utilizing these systems and databases became more automated and computerized, the need to share data over computer networks, such as the Internet, became more and more prevalent. Due to this need, standard formats for the sharing of data were developed.

One such standard format developed is extensible Markup Language ("XML"). XML is a very hierarchical data format, which includes a multitude of data structures having parent-child relationships. In the XML data format, the children of each parent may have further children, which in turn may have still further children, and so on. XML is also written in plain text and thus is a world-wide standard for 'tagging' data. Due to the advent of this standard data format, many computer users have converted the aforementioned databases to the standard XML data format. The XML format also allows computer users to tailor their data to specific documents using schemas. Schemas provide mechanisms to define and describe the structure, content, and to some extent semantics of XML documents.

However, in many instances schemas are not always available to the users of electronic documents having a hierarchical format such as XML. While schemas are not required constructs in the XML data format, many document authors rely on schemas as a means of communicating narrowly tailored data with other users. For example, a financial services company may have its own schema defining the structure and content its XML documents.

With the ease of availability of the personal computer, many users have become proficient in their use and more specifically, in using electronic spreadsheet application programs. Some software application programs have been developed which are capable of "inferring" a schema from hierarchical structured data, however none of these programs are capable of inferring schemas from XML data for use in a spreadsheet environment.

It is with respect to these considerations and others that the present invention has been made.

SUMMARY OF THE INVENTION

In accordance with the present invention, the above and other problems are solved by a method and system for inferring a schema from an electronic document containing hierarchical data for use in a spreadsheet application program.

In accordance with one aspect of the present invention, a method and computer system are provided for inferring a schema from an electronic document containing hierarchical data. The format of the hierarchical data structure may be XML.

First, the electronic document containing the hierarchical data is received into an application program. The application program may be a spreadsheet application program. The hierarchical data includes a set of nodes making up the structure of the hierarchical data. The nodes may be XML elements and attributes.

Next, the hierarchical data is parsed to discover one of the nodes in the hierarchical data. Once the node has been discovered, content associated with the discovered node is saved to a memory location in the computer system. The content may include data associated with the discovered node and the type of data associated with the node.

Next, the hierarchical data is again parsed again to discover subsequent nodes until the content for all of the nodes has been saved to the memory location. Some of the information which is stored in the memory location and which is associated with each node is as follows: Each discovered node is checked to determine the node's location, relationship to other nodes, and context within the hierarchical structure. The occurrence frequency of each discovered node is also checked to determine if the node is a repeating node. If the node is a repeating node, an indicator is stored marking the node as repeating in the memory location in the computer system. The data type of the node is also determined and recorded in the memory location.

Finally, a schema generator generates schema elements for each discovered node until a schema is generated for the hierarchical data. In generating the schema elements repeating nodes and repeating child nodes are generated as a sequence of nodes.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
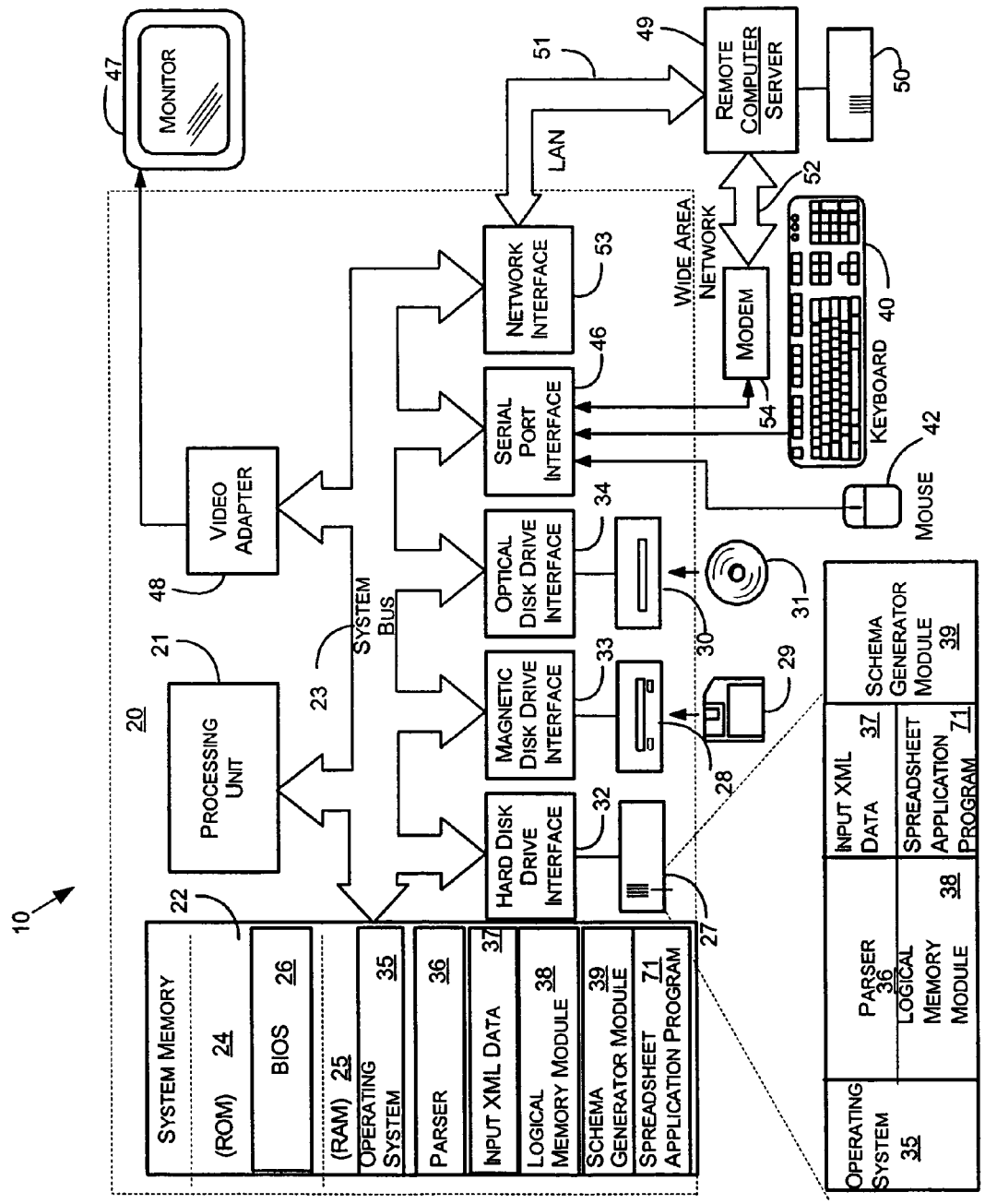
FIG. 1 is a block diagram of a computer system that provides the illustrative operating environment for the present invention.

The present invention is directed to a method and system for inferring a schema from an electronic document containing hierarchical data. In one embodiment, the present invention is incorporated into the "OFFICE" suite of application programs that is marketed by Microsoft Corporation of Redmond Wash. Briefly described, the invention provides for receiving a data formatted in a hierarchical data structure and creating a schema based on that data structure if one is not detected. An example of such a format could include XML, however those skilled in the art will appreciate that may other database structures are highly hierarchical.

In the following detailed description, references are made to the accompanying drawings that form a part hereof, and in which are shown by way of illustration specific embodiments or examples. Referring now to the drawings, in which like numerals represent like elements through the several figures, aspects of the present invention and the illustrative operating environment will be described.

Referring now to FIG. 1, an illustrative operating environment for implementing an illustrative embodiment of the present invention is shown. Within the illustrative operating environment, the present invention may operate to facilitate the inference (or creation) of schema based on a hierarchical data instance. However, those skilled in the art should appreciate that the invention may be practiced in any type of computer operating environment such as hand-held devices, multiprocessor systems, microprocessor-based or programmable consumer electronics, minicomputers, mainframe computers, and the like. The invention may also be practiced in distributed computing environments where tasks are performed by remote processing devices.

The illustrative embodiment of the present invention will be described in the general context of a spreadsheet application program 71 which receives input XML data 37. If the application program 71 determines that the data does not reference a schema, a parser 36 parses the file to discover nodes and create a memory location to maintain information about each node. The information about each node is sent to logical memory module 38 which analyzes each record in the memory location for data about each node which is used by the schema generator module 39 to generate a schema elements for each node. The schema generator module 39 then generates XML schema data 70 from the schema elements inferred from the XML data. The XML schema data 70 may be used in a spreadsheet application program.

As is understood by those skilled in the art, an XML schema is used to provide XML data with a set of grammatical and data type rules governing the types and structure of data that may be included in the file. For example, a "purchase order" file may have an attached or associated schema such as "purchaseorder-schema.xsd" for providing an allowable set of XML nodes (elements or attributes) such as a <date> element, <price> element, <quantity> element, and so on. The schema includes the rules governing the order with which those elements may be applied to the file and specific rules associated with individual elements applied to the file. For example, a schema attached or associated with the "purchase order" file may prescribe that data associated with a given element, for example a <date> element, must include a day element, followed by a month element, followed by a year element. Additionally, the schema may require that a <date> element must immediately precede a <shipmentdestination> element, for example.

As is understood by those skilled in the art, developers of XML schemas determine the names of XML elements and the associated data types and data structures allowed for those elements. These data types may include strings, integers, dates, times of day, or other data types for restricting the type of data associated with XML elements. The World Wide Web Consortium (W3C) at http://www.w3.org/TR/xmlschema-0/simpleTypesTable, the disclosure of which is incorporated herein by reference, has defined a set of standard XML data types.

All users of documents annotated with XML structure according to a given schema may utilize the data contained within the XML structure without regard to the overall type and structure of the file. For example, if a "purchase order" file, described above, is transmitted to a purchaser of the goods, the purchaser may develop software applications for parsing the document to locate specific types of data within the file for use by the purchaser. The purchaser may, for example only wish to print serial numbers and associated prices for certain goods. Using the schema attached to the file, the purchaser will know that the data associated with the XML elements have been prepared according to the schema governing the file. Accordingly, the purchaser may develop a software application or an eXtensible Stylesheet Language Transformation (XSLT) file for locating the <price> element and for extracting the data associated therewith for insertion into the purchaser's own documents. It will be understood by those skilled in the art that there are also other XML technologies for extracting data for insertion into a file including XPath and XPointer.

Following with this example, a number of different purchasers may subscribe to the same schema for dictating the rules associated with the "purchase order" document so that each purchaser may then receive the "purchase order" document from the author of the file and use the data contained in the purchase order according to the XML elements structuring the data. That is, a first purchaser may only be interested in the data contained within the <price> element, while a second purchaser may be interested in extracting only the data contained in a <shipmentterms> element. Each purchaser may extract the data it desires without regard to other aspects or elements of the document by using their own software applications or XSLT transformation files for locating the desired data according to the XML structure. This is made possible by the fact that each user of the document follows the data type and data structure rules prescribed in the schema attached to or associated with the file.

As understood by those familiar with the Extensible Markup Language, XML namespaces provide a method for qualifying elements and attribute names used in XML documents by associating those elements and attribute names with namespaces identified by uniform resources identifier (URI) references. An XML namespace is a collection of names, identified by a URI reference which are used in XML data and XML schema data, XPath expressions, etc, to qualify particular XML elements and attributes, thus limiting the scope of their relevance to a particular namespace. A single XML data file may contain elements and attributes belonging to a multitude of different namespaces that are defined for and used by multiple software modules. For example, in accordance with an embodiment of the present invention, a single XML data file, such as a spreadsheet document, may contain elements and attributes defined and used by different software modules. For example, a spreadsheet document may have elements and attributes defined for and used by a spreadsheet application XML processing module, or the document may contain elements and attributes defined for and used by or associated with schema data associated with the document. For example, elements and attributes may be associated with the spreadsheet document to associate the document with schema data associated with a purchase order, resume document, a legal document, and the like. Accordingly, an individual document, such as an illustrative spreadsheet document may have a namespaces identifying the element types and attribute names associated with each of the different software modules that may consume or use data from the document.

Those skilled in the art will recognize that the invention may be implemented in combination with various other program modules (not shown). Generally, program modules include routines, programs, components, data structures, etc., that perform particular tasks or implement particular abstract data types. Moreover, those skilled in the art will appreciate that the invention may be practiced with computer system configurations other than the one shown, that are linked through a communications network. In a distributed computing environment, program modules may be located in both local and remote memory storage devices.

An illustrative operating environment 10 for implementing the invention includes a conventional personal computer system 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, the parser 36, the logical memory module 37, the schema generator module 39, the spreadsheet application program 71 and other program modules (not shown).

A user may enter commands and information into the personal computer system 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer system 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer system 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used. It will be further be appreciated that the invention could equivalently be implemented on host or server computer systems other than personal computer systems, and could equivalently be transmitted to the host computer system by means other than a CD-ROM, for example, by way of the network interface 53.

Figure 2:
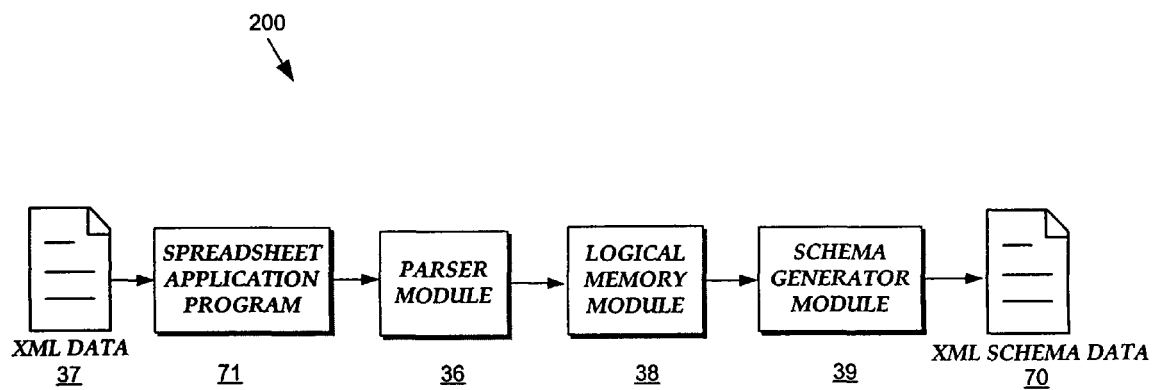
FIG. 2 is a block diagram showing an illustrative architecture for inferring XML schema data from input XML data according to one embodiment of the present invention.

FIG. 2 is a block diagram 200 showing an illustrative architecture for inferring XML schema data from XML data according to one embodiment of the present invention. As briefly described above, the parser 36 receives an input XML data file 37 containing XML data without a schema from the spreadsheet application program 71. The XML data is composed of nodes representing XML elements and attributes annotating content associated with each node. The parser 36 parses the XML data file 37 node by node and sends the content associated with each node to the logical memory module 38. It will be appreciated that the functionality of the parser 36 may be implemented by a Document Object Model ("DOM") parser in conjunction with a Simple API for XML ("SAX") parser. As is known to those skilled in the art, DOM parsers are tree-based parsers which load an entire XML file into memory and SAX parsers are event-based parsers capable of reading XML nodes (elements or attributes) sequentially, one at a time. An example of a DOM parser is MSXML DOM provided by Microsoft Corporation of Redmond, Wash. In one embodiment of the invention, the DOM parser may be used to receive the input XML data file 37 and the SAX parser is used to read each node and send it and associated data to the logical memory module 38. It will be appreciated that the above-described implementation for the parser 36 is but one illustrative implementation and that the functionality of the parser 36 is not limited to the above-described embodiment and that other methods for implementing the functionality of the parser 36 known to those skilled in the art may also be utilized without departing from the scope of the present invention.

The logical memory module 38 receives each node and associated data, one by one, from the parser 36 and analyzes each node for data which is used by the schema generator module 39 to generate schema elements for each node. It will be appreciated that the functionality of the logical memory module 38 may be implemented within a dynamic link library (DLL) within an application program. Once example of such a DLL is the MSO.DLL provided in the "OFFICE" suite of application programs marketed by the Microsoft Corporation of Redmond Wash. The DLL contains a library of executable functions that may be accessed by an application program by creating either a static or dynamic link to the DLL. A static link remains constant during program execution while a dynamic link is created by the program as needed. Illustrative operations used by the parser 36, the logical memory module 38, and the schema generator module 39 in generating the schema data 70 are shown in FIGS. 3-4 and will be described in greater detail below.

Figure 3:
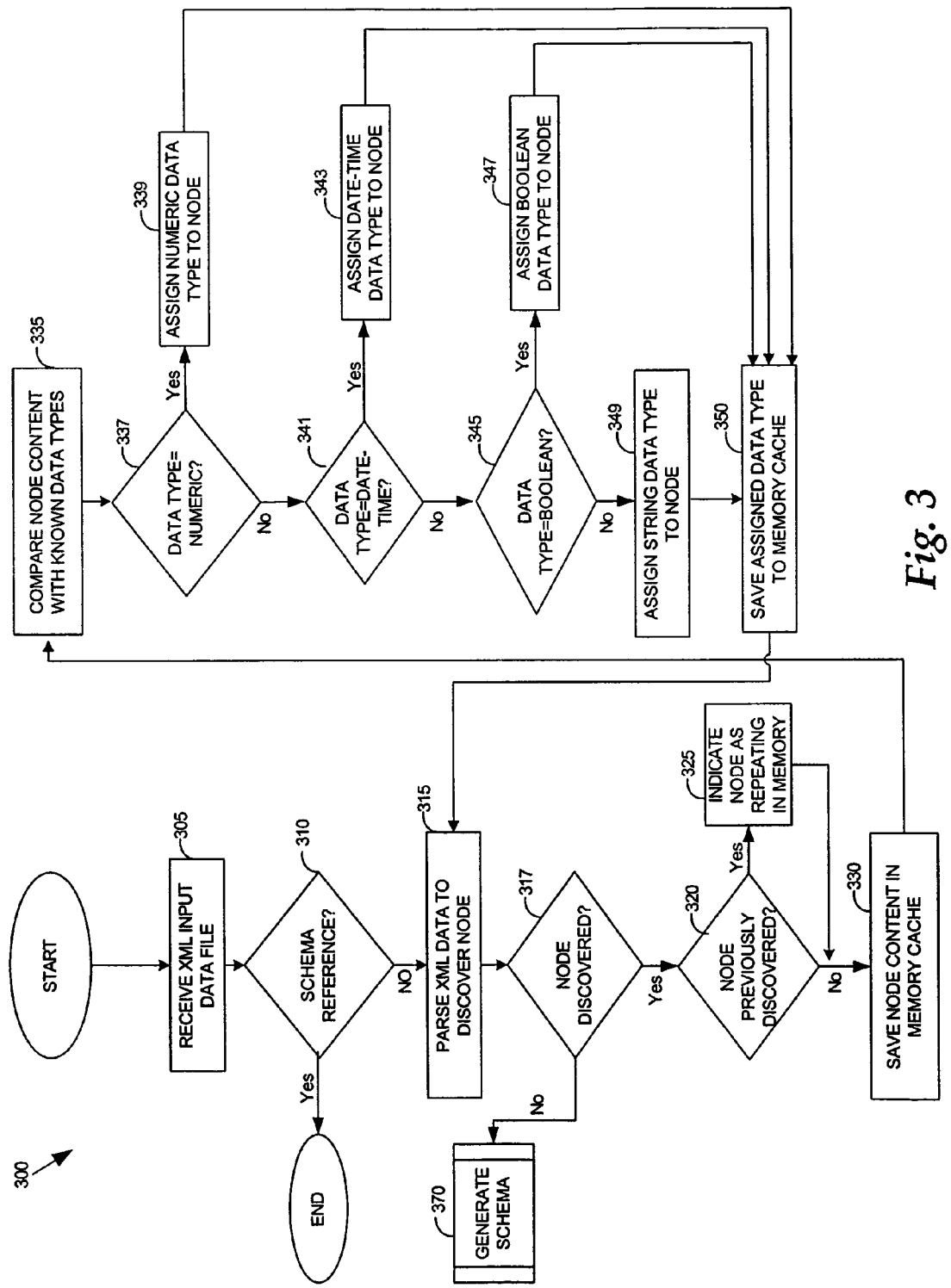
FIG. 3 illustrates an operational flow for generating a schema from hierarchical data in input XML data according to one embodiment of the present invention.
Figure 4:
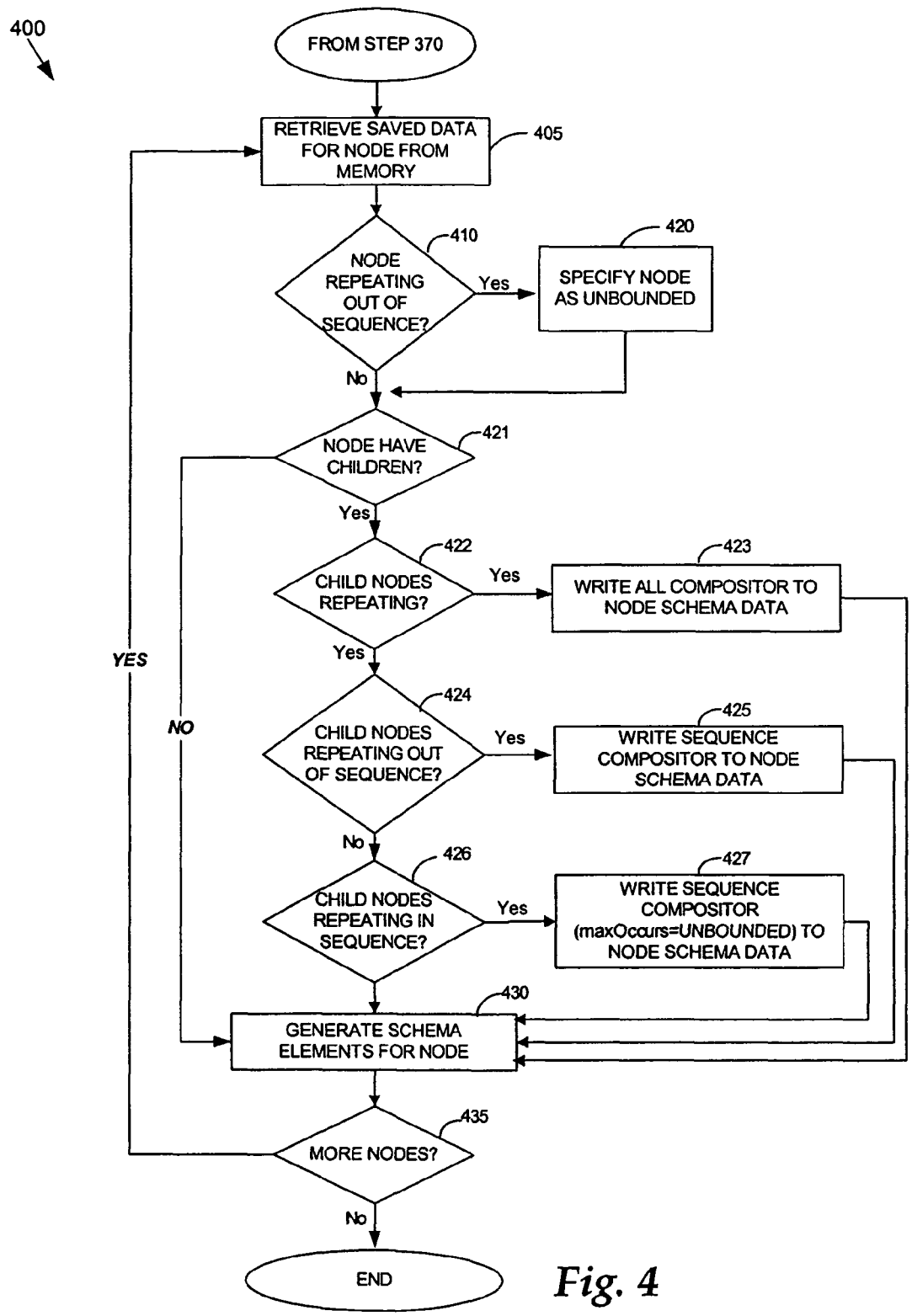
FIG. 4 illustrates an operational flow for generating schema elements for generating a schema from hierarchical data in input XML data according to one embodiment of the present invention.

FIG. 3 illustrates an operational flow 300 for generating a schema from hierarchical data in the input XML data 37 in the personal computer system 20 described above. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The operational flow 300 of FIG. 3 begins at step 305 where the input XML data 37 is opened by the spreadsheet application program 71. The spreadsheet application program 71 then determines if the input XML data 37 references a schema at step 310. The spreadsheet application program 71 may determine if the input XML data file 37 contains a schema reference by looking for a schema embedded in the file or a pointer to a schema file stored in the personal computer system 20 or on a remote computer (such as remote computer 49) accessible by the personal computer system 20 over the network interface 53. If the spreadsheet application program 71 determines that the input XML data 37 does contain a schema, then the existing schema is handed to the spreadsheet application program 71. If the spreadsheet application program 71 determines that the input XML data 37 does not contain a schema, the spreadsheet application program 71 sends the XML data 37 to the parser 36 and the operational flow 300 continues to step 315.

At step 315, the parser 36 receives the XML data 37 and parses the data to discover a node (element or attribute) which is then sent to the logical memory module 38. If, at step 317, no node is discovered, then the operational flow 300 continues to step 370 where the schema generator module 39 generates the schema. The node may include content such as data formatted to a predefined data type. If, at step 317, a node is discovered, the operational flow 300 continues to step 320 where the logical memory module 38 determines whether the node received from the parser 36 has been previously discovered. It should be understood that the logical memory module 38 saves each node name and its associated content in a memory cache after it receives the node from the parser 36.

If, at step 320, the logical memory module 38 determines that the parser 36 has previously discovered (i.e., received) the node name, the logical memory module 38 indicates the node as repeating by saving a placeholder in the memory location for the previously discovered node at step 325. If, at step 320, the logical memory module 38 determines that the node has not been previously discovered, the logical memory module 38 saves the content for the node in the memory cache at step 330. The operational flow 300 then continues to step 335.

At step 335, the logical memory module 38 determines the data type for the content contained in the discovered node. The logical memory module 38 compares the content for the discovered node to a list of known data types (i.e., string, integer, date/time, etc.). The operational flow 300 then continues to step 337.

At step 337, the logical memory module 38 determines whether the data type for the discovered node is a known numeric data type by comparing the node's content to a list of known numeric data types (such as the W3C list of standard XML data types discussed above). If the content for the discovered node matches one of the known numeric data types, the logical memory module 38 assigns the node the numeric data type at step 339 and then saves the assigned data type information in the memory cache at step 350. If, at step 337, the discovered node's data does not match a known numeric data type, the operational flow 300 continues to step 341.

At step 341, the logical memory module 38 determines whether the data type for the discovered node is a known date-time data type by comparing the node's content to a list of known date-time data types (such as the W3C list of standard XML data types discussed above). If the content for the discovered node matches one of the known date-time data types, the logical memory module 38 assigns the node the date-time data type at step 343 and then saves the data type information in the memory cache at step 350. If, at step 341, the discovered node's data does not match a known date-time data type, the operational flow 300 continues to step 345.

At step 345, the logical memory module 38 determines whether the data type for the discovered node is a known Boolean data type by comparing the node's content to a list on known Boolean types (such as the W3C list of standard XML data types discussed above). If the content for the discovered node matches one of the known Boolean data types, the logical memory module 38 assigns the node the Boolean data type at step 347 and then saves the data type information in the memory cache at step 350.

If at step 345, the logical memory module 38 determines that the data type does not match the numeric, date-time, or Boolean data types, the logical memory module 38 assigns the discovered node the default "String" data type "String" at step 349. It should be understood that the "String" data type may include any type of content associated wit a node. The operational flow 300 then continues from step 349 to step 350.

It will be appreciated that the present invention is not limited to the data types discussed above and that additional data types (such as those defined in the W3C list of standard XML data types discussed above) may also be assigned to content of discovered nodes without departing from the scope of the present invention. It will further be appreciated that the logical memory module 38 infers data types for nodes to be as restrictive as possible without violating all of the data content for a particular node (element or attribute). Thus, if the content for a discovered node matches more than one known data type, the most restrictive data type is assigned to the node.

For example, a discovered node may have the following date as its content: "1999-05-31." The date "1999-05-31" corresponds to the standard XML "Date" data type as well as the less restrictive "String" data type (it should be understood that the "String" data type may include any type of content associated with a node). Thus, in this example, the logical memory module 38 would assign the "Date" data type to the discovered node because it is the most restrictive of the two data types. In this manner, the resulting schema will more accurately describe the type of data which may be associated with the discovered node.

After the logical memory module 38 saves the assigned data type for the discovered node to the memory cache at step 350, the operational flow 300 returns to step 315 where the parser 36 parses the input XML data 37 for another node to send to the logical memory module 38. If there are no remaining nodes in the input XML data 37, the operational flow 300 continues to step 370 where the schema generator module 39 generates schema elements for the discovered nodes to create the XML schema data 70.

FIG. 4 illustrates an operational flow 400 utilized by the schema generator module 39 for generating schema elements to create schema data from the input XML data 37, based on the data collected by the logical memory module 38 in FIG. 3. The operational flow 400 begins at step 405 where the schema generator module 39 receives the collected data for a discovered node from the memory cache of the logical memory module 38.

At step 410, the schema generator module 39 determines if the node is repeating out of sequence by checking the collected data for a repeating indicator and a sequence indicator saved in the memory cache of the logical memory module 38. If the schema generator module 39 determines the node is repeating out of sequence, the operational flow 400 continues to step 420 where the maximum occurrence of the node is set to "unbounded." The operational flow 400 then continues to step 421. If at step 410 the schema generator module 39 determines the node is not repeating out of sequence, the operational flow 400 also continues to step 421.

At step 421, the schema generator module 39 determines whether the node has any child nodes. As discussed above in FIG. 3, the logical memory module 38 saves a placeholder in a memory cache for the content of each node discovered from the input XML data 37. If, at step 421, the schema generator module 39 determines that the node does not have child nodes, the operational flow 400 continues to step 430 to generate schema elements (i.e., write the schema definition) for the node. If, at step 421, the schema generator module 39 detects that the node has child nodes the operational flow 400 continues to step 422.

At step 422, the schema generator module 39 determines whether the current node's child nodes are repeating. As discussed above in FIG. 3, the logical memory module 38 saves a placeholder in the memory cache indicating whether each node repeats as determined from the input XML data 37. If, at step 422, the schema generator 39 determines that the child nodes are not repeating, then the operational flow 400 continues to step 423 where the schema generator module 39 determines it will write an "all" compositor for the node in the generated XML schema data 70. The operational flow 400 then continues to step 430 to generate schema elements for the node. If, at step 422, the schema generator module 39 determines that the child nodes are repeating, the operational flow 400 continues to step 424.

At step 424, the schema generator module 39 determines whether the current node has a child node repeating outside the context of the sequence of the current node's children. As discussed above in FIG. 3, the logical memory module 38 saves a placeholder in the memory cache indicating whether each node repeats as determined from the input XML data 37. If the current node has a child node repeating outside the context of the sequence of the children of the current node, the operational flow 400 continues to step 425 where the schema generator module 39 determines it will write a "sequence" compositor for the children of the current node in the generated XML schema data 70. The operational flow 400 then continues to step 430 to generate schema elements for the node. If the schema generator module 39 determines that the child nodes are not repeating within the context of the sequence of the current node's children, then operational flow 400 continues to step 426.

At step 426, the schema generator module 39 determines whether the current node has all children repeating within the context of the sequence of the current node's children. As discussed above in FIG. 3, the logical memory module 38 saves a placeholder in the memory cache indicating whether each node repeats as determined from the input XML data file 37. If the current node has all children repeating within the context of the sequence of the current node's children, the operational flow 400 continues to step 427 where the schema generator module 39 determines it will write a "sequence unbounded" compositor for the children of the node in the generated XML schema data 70. If the schema generator module 39 determines that all children of the current node are not repeating within the context of the sequence of the current node's children, then the operational flow 400 continues to step 430.

It will be appreciated that XML schema compositors are well known to those skilled in the art. Specifically, compositors are XML schema constructs which identify the occurrence requirements or expectations of a node's immediate descendants. The XML "sequence" compositor specifies that nodes must occur in the specified order. Thus, a repeating child node would require a "sequence" compositor in accordance with XML schema constructs.

At step 430, the schema generator module 39 generates schema elements for the node received from the logical memory module 38. The schema elements may include the name of the node, a data type (e.g., "string"), a compositor (e.g., if the node is a repeating child node), an attribute declaration (if the node is an attribute), maximum occurrence, as well as other non-variable information, including minimum occurrence, mixed content flag, and so on to create a full schema definition for that node. The operational flow 400 then continues from step 430 to step 435.

At step 435, the schema generator module 39 determines whether there are any remaining nodes in the input XML data 37 by requesting a subsequent node from the logical memory module 38. If there are remaining nodes, the operational flow 400 returns to step 405 where the schema generator module 39 receives data for another node from the memory cache of the logical memory module 38. If there are no remaining nodes in the memory cache, the operational flow 400 ends and the schema generator module 39 generates the XML schema data 70 from the schema elements generated for the nodes in the input XML data 37.

In view of the foregoing, it will be appreciated that the present invention provides a method and system for inferring (or generating) a schema based on a hierarchical data instance. While the invention has been particularly shown and described with reference to illustrative embodiments thereof, it will be understood by those skilled in the art that various other changes in the form and details may be made therein without departing from the spirit and scope of the invention.

What is claimed is:

1. A method for inferring a schema from hierarchical data within an electronic document, comprising:

in an application program, receiving the electronic document containing the hierarchical eXtensible Markup Language (XML) data and determining from the electronic document that the hierarchical data within the electronic document does not reference a schema, wherein the hierarchical data includes one or more nodes;
  (a) discovering one of the nodes in the hierarchical data;
  (b) saving content associated with the discovered node when the node is not determined to be repeating;
  (c) repeating tasks (a)-(b) until the content for each discovered node has been saved; and
  generating the schema based on the content saved for each discovered node; wherein generating the schema comprises writing a schema definition for each node that includes specifying a maximum occurrence of repeating nodes that are out of sequence as unbounded by checking for a repeating indicator and a sequence indicator, wherein the schema is an XML schema that provides the XML data a set of grammatical and data type rules that govern types and a structure of data that may be included in the electronic document.

2. The method of claim 1, wherein saving the content associated with the discovered node comprises:
  determining whether the discovered node has previously been discovered;
  if the discovered node has been previously discovered, then storing a first indicator indicating that the node is a repeating node; and
    examining the content associated with the repeating node and updating a memory location with a data type of the repeating node; and
  if the discovered node has not been previously discovered, then saving the content associated with the discovered node.

3. The method of claim 1, wherein the content comprises data associated with the discovered node, wherein the data includes information for locating the discovered node.

4. The method of claim 3, further comprising determining a data type for the data associated with each discovered node.

5. The method of claim 4, wherein determining a data type for the data associated with each discovered node comprises:
  comparing the data associated with the discovered node to a list of known data types; and
  determining the data type based on the list of known data types.

6. The method of claim 5, wherein determining the relationship between each discovered node prior to generating the schema comprises:
  determining at least one hierarchical relationship among the discovered nodes by examining the content saved for the discovered nodes, wherein the at least one hierarchical relationship includes a parent-child relationship.

7. The method of claim 1, wherein the application program is a spreadsheet application program.

8. A computer system for inferring a schema from an electronic document containing hierarchical data comprising:
  an application program that determines that the electronic document containing hierarchical data does not reference a schema;
  a memory for storing the hierarchical data, wherein the hierarchical data includes one or more nodes;
  a parser for receiving the hierarchical data from the memory and parsing the hierarchical data in the electronic document to discover the one or more nodes;
  a logical memory module for:
    (a) receiving one of the discovered nodes from the parser;
    (b) determining content associated with the discovered node; and
    (c) saving the content associated with the discovered node in the memory;
    (d) repeating tasks (a)-(c) until the content for each discovered node has been saved in the memory; and
  a schema generator module for generating the schema based on the content saved for each discovered node that includes specifying repeating nodes that are out of sequence as unbounded by checking at least a repeating indicator, wherein the schema provides the electronic document a set of grammatical and data type rules that govern types and a structure of data that may be included in the electronic document.

9. The system of claim 8, wherein in saving the content associated with the discovered node in the memory, the logical memory module:
  determines whether the discovered node has previously been discovered;
  if the discovered node has been previously discovered, then stores a first indicator indicating that the discovered node is a repeating node in the memory; and
  saves the content associated with the repeating node in the memory; and
  if the discovered node has not been previously discovered, then saves the content associated with the discovered node in the memory.

10. The system of claim 8, wherein the content comprises data associated with the discovered node, wherein the data includes information for locating the discovered node.

11. The system of claim 10, wherein the logical memory module determines a data type for the data associated with each discovered node.

12. The system of claim 11, wherein in determining a data type for the data associated with each discovered node, the logical memory module:
  compares the data associated with each discovered node to a list of known data types; and
  determines the data type based on the list of known data types.

13. The system of claim 8, wherein the logical memory module determines at least one hierarchical relationship among the discovered nodes by examining the content saved for the discovered nodes, wherein the at least one hierarchical relationship includes a parent-child relationship.

14. A tangible computer-readable storage medium having computer-executable instructions, which when executed on a computer, perform a method for inferring a schema from hierarchical data comprising:
  in an application program, receiving the electronic document containing the hierarchical data and determining that the hierarchical data within the electronic document does not reference a schema, wherein the hierarchical data includes one or more nodes;
  (a) discovering one of the nodes in the hierarchical data;
  (b) saving content associated with the discovered nodes;
  (c) repeating tasks (a)-(b) until the content for each discovered node has been saved; and
  generating the schema based on the content saved for each discovered node that includes specifying repeating nodes that are out of sequence as unbounded by checking at least a repeating indicator, wherein the schema provides the electronic document a set of grammatical and data type rules that govern types and a structure of data that may be included in the electronic document.

15. The tangible computer-readable storage medium of claim 14, wherein saving the content associated with the discovered node comprises:

determining whether the discovered field has previously been discovered;

if the discovered node has been previously discovered, then storing a first indicator indicating that the node is a repeating node; and examining the content associated with the repeating node and updating a memory location with a data type of the repeating node; and if the discovered field has not been previously discovered, then saving the content associated with the discovered node.

16. The tangible computer-readable storage medium of claim 14, wherein the content comprises data associated with the discovered node, wherein the data includes information for locating the discovered node.

17. The tangible computer-readable storage medium of claim 16, further comprising determining a data type for the data associated with each discovered node.

18. The tangible computer-readable storage medium of claim 17, wherein determining a data type for the data associated with each discovered node comprises:

comparing the data associated with the discovered node to a list of known data types; and determining the data type based on the list of known data types.

19. The tangible computer-readable storage medium of claim 14, wherein the application program is a spreadsheet application program.

* * * * *